US012040952B2

(12) United States Patent
Stolz et al.

(10) Patent No.: US 12,040,952 B2
(45) Date of Patent: *Jul. 16, 2024

(54) UNOBSERVABLE NODE IDENTIFICATION

(71) Applicant: Microsoft Technology Licensing, LLC, Redmond, WA (US)

(72) Inventors: Henry Elias Stolz, Seattle, WA (US); Naga Maruthi Kumari Yakkali, Seattle, WA (US); William Candler Butler, Seattle, WA (US); Evan Roland Stavrou, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,957

(22) Filed: May 1, 2023

(65) Prior Publication Data

US 2023/0275809 A1    Aug. 31, 2023

Related U.S. Application Data

(63) Continuation of application No. 17/164,769, filed on Feb. 1, 2021, now Pat. No. 11,677,629.

(51) Int. Cl.
*G06F 15/173* (2006.01)
*H04L 41/12* (2022.01)
*G06F 9/455* (2018.01)

(52) U.S. Cl.
CPC .......... *H04L 41/12* (2013.01); *G06F 9/45558* (2013.01); *G06F 2009/45562* (2013.01)

(58) Field of Classification Search
CPC . H04L 41/12; H04L 41/0893; H04L 41/0895; H04L 41/22; H04L 43/028; H04L 43/0876; H04L 43/10; H04L 43/20; H04L 41/046; H04L 41/0853; G06F 9/45558; G06F 2009/45562; G06F 11/3051
See application file for complete search history.

(56) References Cited

U.S. PATENT DOCUMENTS

| 11,677,629 B2* | 6/2023 | Stolz | H04L 41/0853 |
| | | | 709/223 |
| 2018/0359150 A1* | 12/2018 | Perfect | H04L 43/08 |
| 2019/0050455 A1* | 2/2019 | Noe | G06F 11/1484 |

* cited by examiner

*Primary Examiner* — John B Walsh

(57) ABSTRACT

The disclosed technology is generally directed to the identification of unobservable nodes. In one example of the technology, a set of monitored machines are monitored. Each of the monitored machines includes associated monitoring logic. Monitoring the set of monitored machines includes receiving the machine information from the monitoring logic. A total inventory list of the set of monitored machines is generated in a manner that is independent of the monitoring of the monitored machines. An agent inventory list is generated such that the agent inventory list is a list of machines that, based on the monitoring of the monitored machine, are determined to have been running monitoring logic during a particular time period. Unobservable machine information that is associated with a set of unobservable machines is determined based on a comparison of the total inventory list with the agent inventory list.

20 Claims, 6 Drawing Sheets

UNOBSERVABLE NODE IDENTIFICATION

CROSS-REFERENCE TO RELATED APPLICATIONS

This application is a continuation of U.S. patent application Ser. No. 17/164,769 filed on Feb. 1, 2021, entitled "Unobservable Node Identification," which is incorporated herein by reference in its entirety.

BACKGROUND

In some examples, a virtual machine (VM) is an emulation of a computer system that provides the functionality of a physical computer system. A host machine may create and run multiple VM instances. In some scenarios, VMs may be accessed from the cloud by users, the VMs may be accessed on behalf of users, or the VMs may be performing backend services. In some situations, hosts for VMs may be used in a multi-tenant manner, so that a single host may serve several different tenants.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to unobservable machine identification, which operates as follows in some examples. A group of machines may be monitored. The monitoring of the machines may include monitoring of performance issues, security issues, the health of applications running on the machines, and other issues associated with the health, performance, and usage of the machines. Monitoring logic on the machines may track and transmit information associated with the health, performance, and usage of the machines.

In some examples of the technology, the health of the monitoring service itself may be monitored by a meta-monitoring service to determine any issues that may be present in the monitoring service. If the health of the monitoring service were monitored by the monitoring service itself, issues occurring in the monitoring service might prevent the monitoring service itself from identifying those issues. Issues impacting the health of the monitoring service may include issues partially or fully preventing the transmission of monitoring information from a monitored machine, rendering the machine unobservable. The meta-monitoring service may identify unobservable machines based on a total inventory list and an agent inventory list.

The total inventory list of the set of monitored machines is generated in a manner that is independent of the monitoring of the monitored machines. The agent inventory list is generated such that the agent inventory list is a list of machines that, based on the monitoring of the monitored machine, are determined to have been running the monitoring logic during a particular time period. The meta-monitoring service may output a list of the unobservable machines, a service level indicator (SLI) that indicates that percentage of machines that are observable, or both. The outputs provided by the meta-monitoring service may provide useful information about the health of the monitoring service that might monitor a large quantity of machines, and do so in a way that ensures that the accuracy of the information about the health of the monitoring service is resilient to the problems that are being measured.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
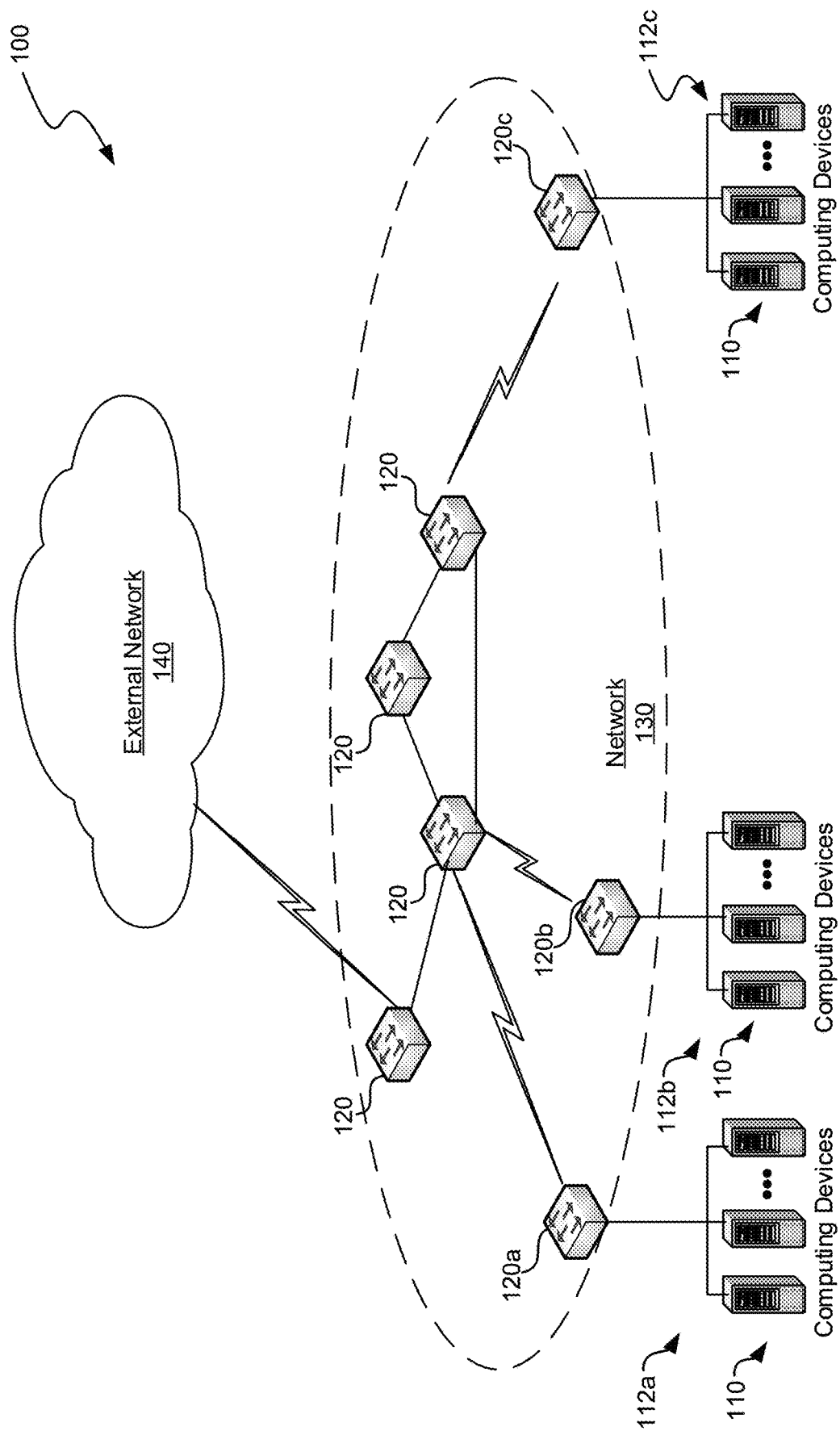
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to unobservable machine identification, which operates as follows in some examples. A group of machines may be monitored. Monitoring the machines may include monitoring performance issues, security issues, the health of applications running on the machines, and other issues associated with the health, performance, and usage of the machines. Monitoring logic on the monitored devices may track and transmit information associated with the health, performance, and usage of the machines. The monitoring service may operate on behalf of the host, on behalf of multiple customers who utilize the machines or otherwise have an interest in monitoring the machines, and/or the like.

In some examples of the technology, the health of the monitoring service itself may be monitored by a meta-monitoring service to determine any issues that may be present in the monitoring service. If the health of the monitoring service were monitored by the monitoring service itself, issues occurring in the monitoring service might prevent the monitoring service itself from identifying those issues. The meta-monitoring service may identify unobservable machines based on a total inventory list and an agent inventory list.

The total inventory list of the set of monitored machines is generated in a manner that is independent of the monitoring of the monitored machines. The agent inventory list is generated such that the agent inventory list is a list of machines that, based on the monitoring of the monitored machine, are determined to have been running monitoring logic during particular time period. The meta-monitoring service may output a list of the unobservable machines, a service level indicator (SLI) that indicates that percentage of machines that are observable, or both. The outputs provided by the meta-monitoring service may provide useful information about the health of the monitoring service that might monitor ins of millions of machines, and do so in a way that ensures that the accuracy of the information about the health of the monitoring service is resilient to the problems that are being measured.

The monitoring service may be provided for a large number of machines. In some examples, the machines are nodes which may be virtual machines and/or physical machines, which may include millions of nodes in a multi-tenant environment being run on host nodes in large data centers in various geographical locations throughout the world. In various other examples, the machines may instead be phones, IoT devices, or any suitable virtual and/or physical machines that are being monitored.

The monitoring service determines various information about the machines being monitored. As part of the monitoring, monitoring logic on the machines may collect event information (e.g., system logs, performance metrics, security events, application events, etc.) from a machine and transmit information associated with the events in some manner, such as by forwarding information associated with the events to a pipeline for downstream consumption. The monitoring service may receive and process the information associated with the events transmitted by the monitoring logic.

The meta-monitoring service may determine aspects of health of the monitoring service, including ensuring that the monitoring logic is not dropping any critical data, sending data too late, and/or the like. In some examples, the monitoring logic comprises monitoring agents that are installed on the monitored machines. The meta-monitoring service may also determine information about any unobservable machines, where machines may be unobservable because, for example, the monitoring agent has unexpectedly not started at all, or has started but is unable to send the information that the monitoring agent is expected to send.

As discussed above, the meta-monitoring service may determine information about unobservable machines by determining a total inventory list and an agent inventory list, and then perform a comparison based on the total inventory list and the agent inventory list. In some examples, the total inventory list is a list of distinct monitored machines (VMs and physical machines) that are in an appropriate health state such that the monitoring agent (or other monitoring logic) is expected to be present and running. The total inventory list contains identifying information for each of the machines in the list. The total inventory list is populated from a data pipeline or other mechanism that does not rely on the monitoring service. The total inventory list is independent of the monitoring service so that the total inventory list does not contain any inaccuracies caused by issues with the monitoring service itself.

The agent inventory list is a list of distinct instances of machines that have an agent (or other monitoring logic) that has sent information within a particular time window. The agent inventory list contains identifying information about the machine on which the monitoring logic is running, including the identifying information for the machine on which it is running and identifying information for customer(s) on behalf of which the monitoring logic is collecting data.

A comparison based on the total inventory list and the agent inventory list may be performed in order to determine the information about unobservable machines. For instance, the total inventory list and the agent inventory list may be joined using a machine identification present in both, and the result may be analyzed for machines where no matching monitoring logic exists (i.e., "unobservable machines"). This list may be used to generate an Observable Machines SLI that is used to track overall and customer-specific fleet health.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120C can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/ or other suitable computing services.

In some examples, one or more of the computing devices 110 is a device that is configured to execute an instance of a distributed application in which a framework is used to provide and enforce dependencies for messages sent between instances of the distributed application.

Illustrative Computing Device

Figure 2:
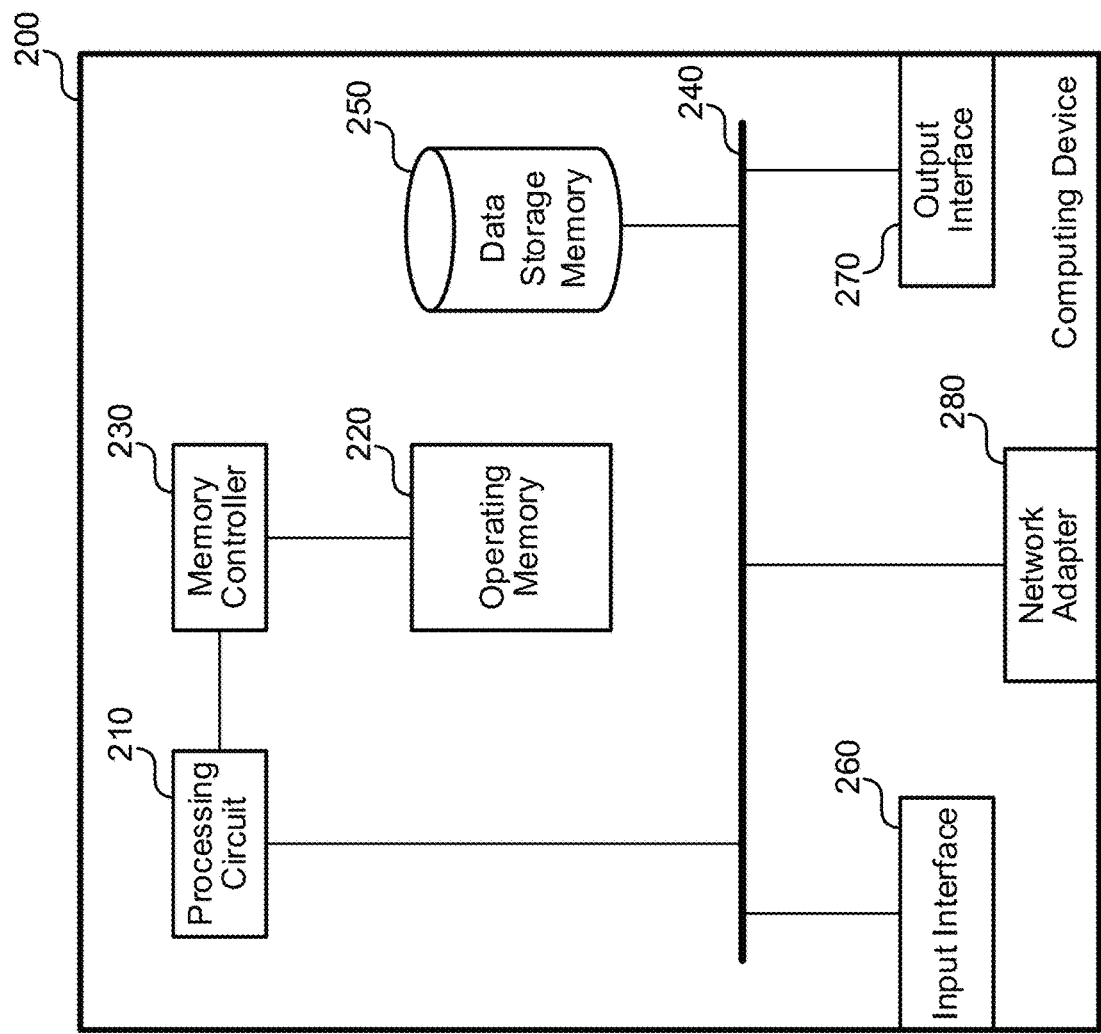
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices, a device within any of the distributed systems, illustrated in or referred to in FIG. 3, FIG. 4, or FIG. 5, as discussed in greater detail below. As illustrated in FIG. 2, computing device 200 includes processing circuit 210, operating memory 220, memory controller 230, data storage memory 250, input interface 26o, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point-to-point links, an input/output controller, a bridge, other interface circuitry, or any collection thereof may also be suitably employed for interfacing data storage memory 250, input interface 26o, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, where the actions may include, in some examples, determining and providing information associated with unobservable machines based on a total inventory list and an agent inventory list.

Illustrative System

Figure 3:
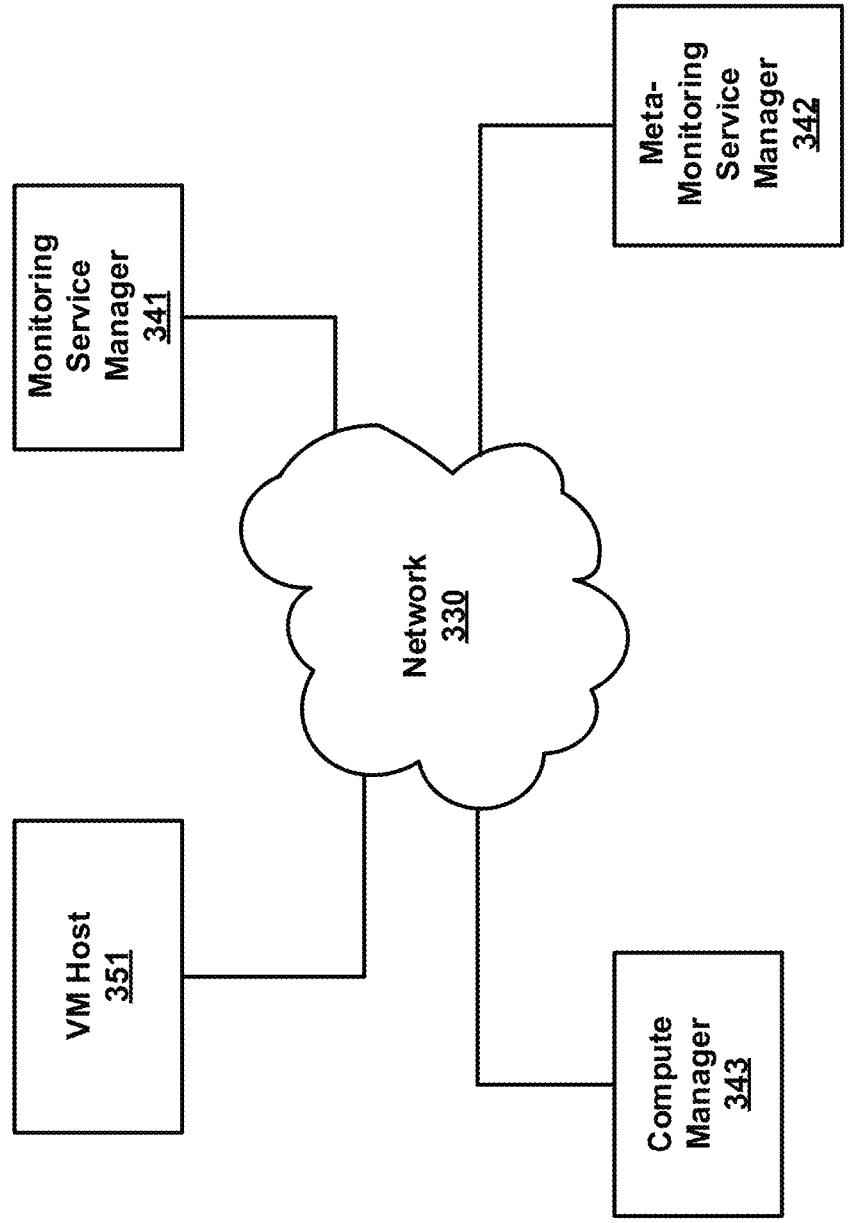
FIG. 3 is a block diagram illustrating an example of a system.

FIG. 3 is a block diagram illustrating an example of a system (300). System 300 may include network 330, as well as monitoring service manger 341, meta-monitoring service manger 342, compute manager 343, and virtual machine (VM) host 351, which all may connect to network 330.

In some examples, virtual machine host 351 is a distributed system that is configured to create and run VMs, responsive to control from, inter alia, compute manager 343. In some examples, compute manager 343 is a distributed system that is configured to manage one or more particular aspects of the VMs created and run by VM host 351.

In some examples, monitoring service manager 341 is a distributed system that is configured to manage/orchestrate the monitoring service. The monitored nodes may include VMs created and run by VM host 351. Monitoring logic on each of the monitored nodes may collect and transmit information associated with the health, performance, and usage of the node on which the monitoring logic is operating. In some examples, monitoring service manger 341 is configured to receive and process the information transmitted by the monitoring logic.

Meta-monitoring service manager 342 may monitor the health of the monitoring service. In some examples, meta-monitoring service manager 342 is a distributed system that is arranged to determine and provide information associated with unobservable machines based on a total inventory list and an agent inventory list, as discussed in greater detail above and below.

Each of the distributed systems in system 300 in may include examples of computing device 200 of FIG. 2.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 includes any communication method by which information may travel among as monitoring service manager 341, meta-monitoring service manager 342, compute manager 343, and/or virtual machine VM host 351. Although each device or service is shown connected as connected to network 33*o*, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

System 300 may include more or less devices than illustrated in FIG. 3, which is shown by way of example only.

FIG. 3 illustrates an example of system 300 in which the monitored machines are monitored nodes that includes physical machines and/or virtual machines executed and running in a virtual machine host. However, in other examples, the monitored machines may be other suitable types of monitored machines, including phones, IoT devices, or other suitable types of machines.

Figure 4:
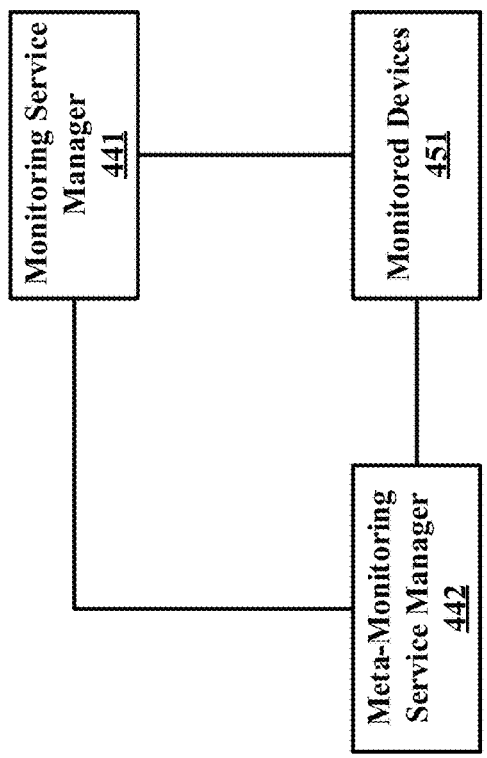
FIG. 4 is a block diagram illustrating another example of a system.

FIG. 4 is a block diagram illustrating an example of a system (400). System 400 may be an example of system 300 of FIG. 3, or vice versa. System 400 may include monitored devices 451, monitoring service manager 441, and meta-monitoring service manager 442.

In some examples, monitored devices 451 are the physical hardware that is associated with monitored machines that are monitored under the control of monitoring service manager 441. Monitored devices 451 may include, for example, monitored physical machines and/or devices on upon which monitored virtual machines are executing. In some examples, the machines are nodes which may be virtual machines and/or physical machines. In some examples, the monitored devices may include millions of nodes in a multi-tenant environment being run on host nodes in large data centers in various geographical locations throughout the world. In various other examples, the machines may instead or additionally be phones, IoT devices, and/or any suitable virtual and/or physical machines that are being monitored.

In some examples, monitoring service manger 441 is a distributed system that is configured to manage a monitoring service that monitors the health of the monitored machines. Monitoring logic on the monitored devices 451 may collect and transmit information associated with the health of the machine on which the monitoring logic is operating. In some examples, as part of managing the monitoring service, monitoring service manager 441 may receive and process the transmissions sent by the monitoring logic on the monitored devices 451.

In some examples, meta-monitoring service 442 is used to determine the health of the monitoring service itself. In some examples, the monitoring logic comprises monitoring agents that are installed on the monitored machines. The meta-monitoring service may determine aspects of the health of the monitoring service, including ensuring that the monitoring agents are not dropping any critical data, sending data too late, and/or the like. The meta-monitoring service may also determine information about any unobservable machines, which are machines in which the monitoring agent has unexpectedly not started at all, or has started but is unable to send the information that the monitoring agent is expected to send. In some examples, meta-monitoring service manger 442 determines information about unobservable machines by determining a total inventory list and a node inventory list, and then performing a comparison based on the total inventory list and the node inventory list.

In some examples, the total inventory list is a list of distinct monitored machines that are in an appropriate health state such that the monitoring agent (or other monitoring logic) is expected to be present and running. In some examples, the total inventory list contains identifying information for each of the machines in the list. In some examples, the total inventory list is determined in a manner that is independent of the monitoring service so that the total inventory list does not contain any inaccuracies caused by issues with the monitoring service. The total inventory list may include identifying information for each of the machines in the total inventory list, including information that uniquely identities each of the machines in the total inventory list. In some examples, the identifying information for each of the machines in the total inventory list is a globally unique identifier (GUID) of each of the machines in the total inventory list. In other examples, the identifying information may instead include a type of unique identification other than a GUID.

The total inventory list may also include other information for the machines in the total inventory list. For instance, for some examples in which the monitored machines are nodes, the total inventory list may include identifying information such as the machine name; the machine GUID; a group, classification, or the like to which the machine belongs; the logical or physical region of the machine; and/or the like. In some of these examples, the machine GUID of each machine may be generated by the operating system of the machine.

The manner in which meta-monitoring service manager 442 determines the total inventory list varies in different examples. In some examples, meta-monitoring service manger 442 consumes data from one or more services that are independent of the monitoring service that contains information related to the health state and existence of various monitored machines. In some examples in which the monitored machines are monitored nodes, the total inventory list is aggregated from a number of teams that maintain the physical compute assets and manage the compute fabric for the monitored nodes. In other examples, the total inventory list is aggregated in other suitable ways.

In some examples, once meta-monitoring service manager 442 has amalgamated the needed information, filtering is applied to remove machines that are not appropriate for monitoring due to their health states, due to being assets that monitoring applications are not expected to be running on, and/or the like. The filtering may also include de-duplication so that one machine is not included as more than one machine in the list. In some examples, the gathered information includes a GUID or other unique identifier that is used in the process of performing the de-duplication. In some examples, the avoidance of duplicates may be accomplished in another suitable way. The filtering may also be based on gathered information collected to generate the total inventory list, independent of the monitoring service and out-of-band from the monitoring service, as to which machines are healthy and expected to be monitored, and which machines are either unhealthy, not expected to be monitored, or the like, and therefore excluded from the total inventory list during the filtering.

In some examples, once the filtering is complete, the product of the amalgamating and filtering is persisted in a scheduled and reliable way. In this way, the total inventory list may be suitably updated over time.

In some examples, the agent inventory list is a list of distinct instances of machines that have a monitoring agent (or other monitoring logic) that has sent information within a particular time window. For instance, in some example, the time window is the last 24 hours. In other examples, other suitable time windows may be used. In some examples, the agent inventory list contains identifying information about the machine on which the agent is running, including identifying information for the machine on which it is running and information about which customer(s) this application instance is running for.

In some examples, in some monitoring agents, during normal operation, each properly running monitoring agent that is installed on a monitored machine is transmitting data associated with the health of the machine that the agent is monitoring. In various examples, as part of determining the agent inventory list, meta-monitoring service manager 442 determines which monitoring agents have sent information during the particular time window either directly or indirectly. In some examples, the monitoring agents transmit information to meta-monitoring service manager 442 directly. In other examples, the monitoring agents do not transmit information directly to meta-monitoring service manager 442, but instead transmits the information elsewhere, and meta-monitoring service manager 442 determines which monitoring agents have sent information during the time window directly or indirectly from the entities to which the information from the monitoring agents is transmitted. For instance, in some examples, the information from the monitoring agents may be transmitted to monitoring service manager 441, and the customers use a defined schema to provide information about information transmitted from the monitoring agents to meta-monitoring service manager 442.

In some examples, de-duplication is also performed on the machines in the agent inventory list, so that no one machine is treated as more than one machine in the list. In some examples, the gathered information includes a GUID or other unique identifier that is used in the process of performing the de-duplication. In some examples, ensuring that there are not duplicates is accomplished in another suitable way.

In some examples, meta-monitoring service manager 442 causes a comparison to be performed based on the total inventory list and the agent inventory list in order to determine information about unobservable machines. For instance, in some examples, the total inventory list and the agent inventory list are joined using a machine identification present in both, and the result is analyzed for machines where no matching monitoring logic exists (i.e., "unobservable machines"). In some examples, this list is used to generate an Observable Machines SLI. In some examples, the SLI is the percentage of monitored machines that are observable. In some examples, the SLI is determined as the ratio the number of machines in the agent inventory list to the number of machines in the total inventory list. In various examples, meta-monitoring service manager 442 outputs information based on the unobservable machines, where the information may include the list of unobservable machines, the observable machines SLI, and/or other suitable information based on the determined unobservable machines.

The meta-monitoring service may be scoped at various levels in various examples. For instance, information may be provided based on all of the monitored machines, based on all of the monitored machines for a particular customer, based on all of the monitored machines of a particular type for a particular customer, based on all of the monitored machines in a particular logical or physical region, or the like.

For instance, in some examples, information may be based on all of the compute nodes, or based on all of the compute nodes for a particular customer. In this way, in some examples, the total inventory list may be the total list of monitored compute nodes for a particular customer, the agent inventory list may be for monitoring agent on compute nodes for the particular customer, and the unobservable nodes information may be provided based on the compute nodes for the particular customer. Similar lists and information may then correspondingly exist for each customer.

As discussed above, in some examples, the monitoring logic consists of a monitoring agent installed on each of the monitored nodes. In some of these examples, the meta-monitoring service may regard the monitoring agent on each of the monitored nodes as a target application for which it is determined whether the target application has been running during the particular time window. This may enable the meta-monitoring service to determine whether the machines on which the monitored agent is installed should be in the agent inventory list. In this way, in some examples, the monitoring logic consists of dedicated monitoring agents running on the monitored machines.

In other examples, the monitoring logic may not be a single application such as a monitoring agent on each of the monitored nodes, but may instead come from a set of applications on each of the monitored nodes, one or more components of the operating system of the monitored node, and/or the like. In this way, in some examples, the monitoring logic does not necessarily consist of dedicated monitoring agents running on the monitored machines, but may instead, in some examples, come from the direct transmission of health information from the machine's application(s) and/or operating system to monitoring service manager 441. In some examples, this may be achieved through a software development kit (SDK) that provides functions that developers can use to instrument their program to emit monitoring event information directly to monitoring service manager 441. In some examples, one or more such SDKs may auto-instrument application(s) on the monitored node without explicit instrumentation on the part of the application developers.

The monitoring service may be active, passive, or both active and passive in various examples. For instance, in some examples, the monitoring service is based on a "listening" or "passive" model where the monitoring service accepts telemetry sent from machines. In some examples, the monitoring system is a "watchdog" or "active" style monitoring service where monitoring service manager 441 itself periodically pings/contacts the monitored machines, and an agent or other application or component on the machine provides a structured response. In some of these examples, the direct contents of the response are then ingested into the monitoring pipeline, or the monitoring service may then do some interpretation of the response signal and ingest the interpreted result into the monitoring pipeline. In various examples, the monitoring service could use the "passive" model, the "active" model, a combination of the two, another suitable model, and/or the like.

In various examples, system 400 may include one or more separate monitoring services, and meta-monitoring service manager 442 may include checks for health, including observability, for one specific monitoring service or for one or more specific monitoring services.

Figure 5:
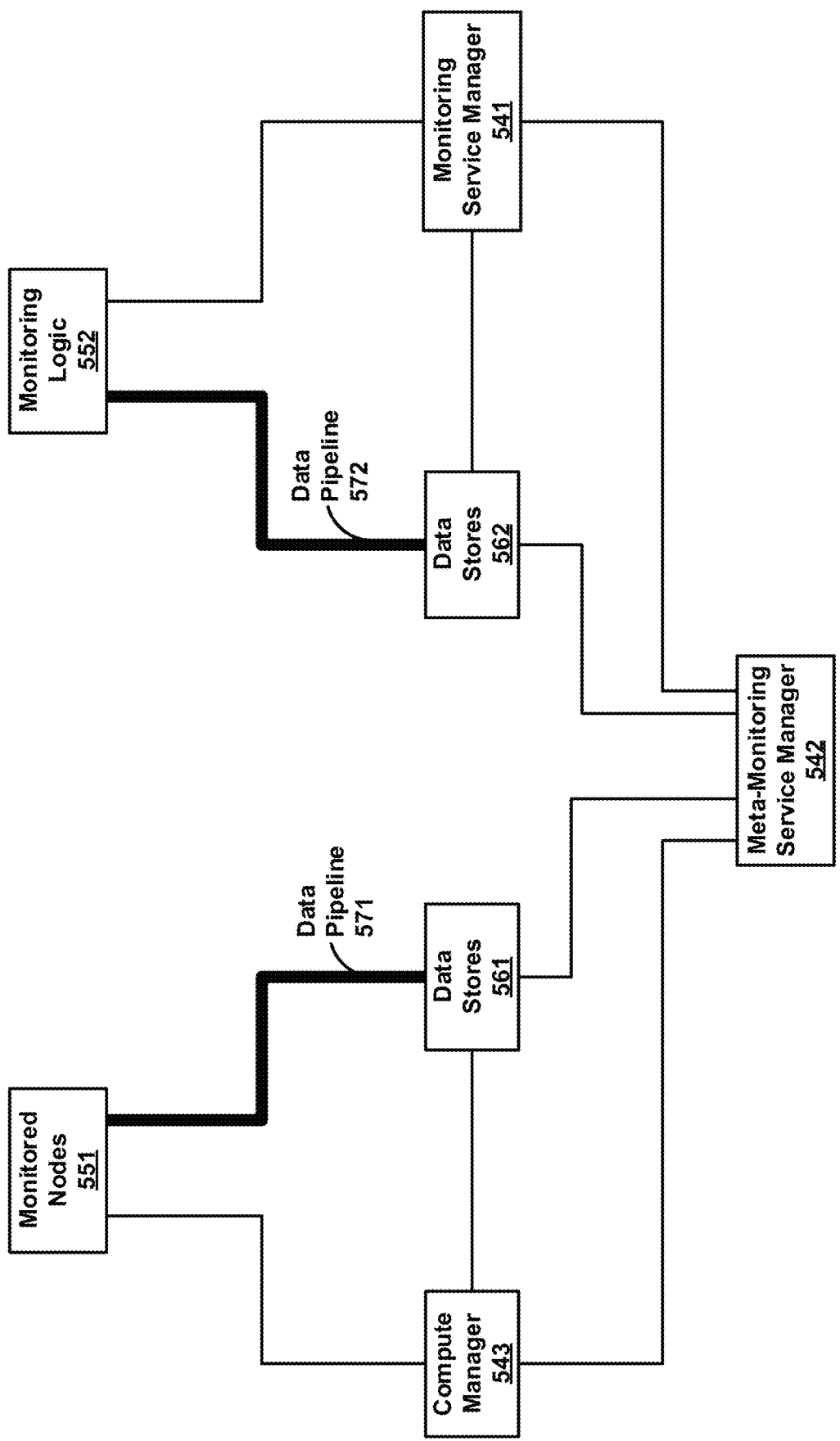
FIG. 5 is a functional block diagram illustrating an example of a system that may be an example of the system of FIG. 3 and/or FIG. 4.

FIG. 5 is a functional block diagram illustrating an example of system 500. System 500 may be an example of system 300 of FIG. 3 and/or system 400 of FIG. 4. System 500 may include monitored nodes 551, monitoring logic 552, monitoring service manager 541, meta-monitoring service manager 542, compute manager 543, data stores 561, data stores 562, data pipeline 571, and data pipeline 572. FIG. 5 is a functional block diagram, and thus shows the monitored nodes 551 and the monitoring logic 552 separately, even though the monitoring logic 552 is on the monitored nodes 551 themselves.

In some examples, monitored nodes 551 are virtual machines and physical machines being run on host nodes in a multi-tenant environment. Compute manager 543 may manage one or more particular aspects of monitored nodes 551. Monitoring service manager 541 may control the monitoring of the health, performance, and usage of monitored nodes 551. In some examples, monitoring logic 552 may comprise a monitoring agent installed on the devices on which monitored nodes 551 reside. Each of the monitoring agents 552 may collect event information (e.g., system logs, performance metrics, security events, application events, information about the rate of page requests, information about active connections, information about authentication failures, other telemetry information, and/or the like) on the node 551 that the monitoring agent 552 is monitoring. Monitoring agents 552 may forward the information associated with the events to data pipeline 572, to be stored in various data stores 562. Monitoring service 541 may retrieve information from data stores 562 in order to provide monitoring data from monitored nodes 551 to customers when requested.

Compute manager 543 may manage various aspects of monitored nodes 551, including the communication of various information from monitored nodes 551 to various data stores 561 via data pipeline 571. In some examples, monitored nodes 551 may be distributed through various data centers in various geographical locations. In some examples, data centers are arranged in tree hierarchy, with hierarchies of data centers, and with hierarchical levels of nodes within each data center. In some examples, a data center may be divided into clusters, and clusters may be further subdivided into lower hierarchical levels. Computer manager 543 or other comparable management may exist at more than one hierarchical level. Compute manager 543 may manage aspects of the hierarchy, and may manage the health, tracking, and existence of nodes, and manage data stores 561, including the data sent to data stores 561, the indexing of information in data stores 561, and/or the like.

Data store 561 may include a number of various data stores, and may include data stores in various different geographical locations. In some examples, information stores in data stores 561 may be indexed by indexing software. In some examples, information in data stores 561 may be periodically queried in an automatic way by compute manager 543 and/or meta-monitoring service manager 542.

Similarly, data store 562 may include a number of various data stores, and may include data stores in various different geographical locations. In some examples, information stores in data stores 562 may be indexed by indexing software. In some examples, information in data stores 562 may be periodically queried in an automatic way by monitoring service manager 541 and/or meta-monitoring service manager 542.

In some examples, meta-monitoring service manager 542 determines the health of the monitoring service. The meta-monitoring service may determine aspects of health of the monitoring service, including ensuring that monitoring agents 552 are not dropping any critical data, sending data too late, and/or the like. The meta-monitoring service may also determine information about any unobservable nodes, which are nodes among monitored nodes 551 in which the monitoring agent has unexpectedly not started at all, or has started but is unable to send the information that the monitoring agent is expected to send.

The meta-monitoring service may determine information about unobservable nodes by determining a total inventory list, determining an agent inventory list, and then performing a comparison based on the total inventory list and the agent inventory list.

In some examples, the total inventory list is a list of distinct monitored nodes that are in an appropriate health state such that the monitoring agent is expected to be present and running. In some examples, the total inventory list contains identifying information for each of the nodes in the list. In some examples, the total inventory list is determined in a manner that is independent of the monitoring service so that the total inventory list does not contain any inaccuracies caused by issues with the monitoring service. The total inventory list may include identifying information for each of the nodes in the total inventory list, including information that uniquely identities each of the nodes in the total inventory list. In some examples, the total inventory list may include identifying information such as the node name, the node GUID, compute environment/cluster/region, and/or the like. In some examples, the node GUID of a node may be generated by the operating system of the node.

In some examples, data is pulled from various upstream services that are independent of the monitoring service (including the monitoring agents) and that contains information related to the health state and existence of various monitored nodes 551, via data pipeline 571 to data stores 561; information in data stores 561 is indexed; and the total inventory list is aggregated from various information in data stores 561 that originates from a number of teams that maintain the physical compute assets and manage the compute fabric for monitored nodes 551. Compute manager 543 is shown as performing such management for simplicity, but as discussed above, in some examples, a number of teams may perform such management rather than just compute manager 543.

In some examples, once meta-monitoring service manager 542 has amalgamated the needed information for generating the total inventory list, filtering is applied to remove nodes that are not appropriate for monitoring due to their health states, due to being assets that applications are not expected to be running on, and/or the like. The filtering may also include de-duplication so that one node is not included as more than one node in the list. In some examples, the gathered information includes a GUID that is used in the process of performing the de-duplication. In some examples, ensuring that there are no duplicates is accomplished in another suitable way.

The filtering may also be based on gathered information from the upstream sources, independent of the monitoring service and out-of-band from the monitoring service, as to which nodes are healthy and expected to be monitored, and which nodes are either unhealthy, not expected to be monitored, or the like, and therefore excluded from the total inventory list during the filtering. The information may include, in some examples, information about outages provided at the cluster level. In some examples, monitored nodes may be in various states, such as, for instance, a healthy state, a probation state, a dead state, a buildout state, or a healthy state. In some examples, only monitored nodes that are in a healthy state are included in the total inventory list, and monitored nodes that are not in a healthy state are excluded from the total inventory list during the filtering. Throughout the specification and the claims, "healthy state" is defined as follows: a monitored machine that is in a healthy state is a monitored machine for which it is expected that the machine can be monitored, whereas it is not expected that machines that are not in a healthy state can be monitored. Accordingly, in some examples, excluding nodes that are not in a healthy state excludes nodes that are not expected to be able to be monitored.

In some examples, once the filtering is complete, the product of the amalgamating and filtering is persisted in a scheduled and reliable way. In this way, the total inventory list may be suitably updated over time.

In some examples, the agent inventory list is a list of distinct instances of nodes that have a monitoring agent (or other monitoring logic) that has sent information within a particular time window. In some instances, the time window is the last 24 hours. In other examples, other suitable time windows may be used. In some examples, the agent inventory list contains identifying information about the node on which the agent is running, including, for example, the GUID of the node on which it is running and information about which customer this application instance is running for. For instance, in some examples, the information about which customer this application instance is running for may include the information associated with the customer on behalf of which the agent is collecting data. In some examples, for each of monitored nodes 551, the GUID of the node is provided by the operating system of the node.

In some examples, as part of determining the agent inventory list, based on information in data stores 562, meta-monitoring service manager 542 determines each of the distinct tenants and node GUIDs that sent any data over the time period. In some examples, meta-monitoring service manager 542 also causes de-duplication to be performed on the nodes in the agent inventory list, so that no one node is treated as more than one node in the agent inventory list. In some examples, the GUID is used in the process of performing the de-duplication in order to determine which nodes are duplicates. In some examples, ensuring that there are not duplicates is accomplished in another suitable way. For instance, in some examples, de-duplication may be accomplished by an external entity, or information may be provided in such a way there are no duplicates.

In some examples, after obtaining the total inventory list and the agent inventory list, meta-monitoring service manager 542 causes a comparison based on the total inventory list and the agent inventory list to be performed in order to determine information about unobservable nodes. For instance, in some examples, the total inventory list and the agent inventory list are joined using a node identification present in both, and the result is analyzed for nodes where no matching monitoring agent (or other monitoring logic) exists (i.e., "unobservable nodes"). In some examples, the GUID of the nodes in each list may be used to determine which nodes in total inventory list are the same as nodes in the agent inventory list. In some examples, the information provided may also include information about nodes that have a monitoring agent (or other monitoring logic) running, and information about the tenant that the monitoring agent was running for.

In some examples, the list of unobservable nodes is used to generate an Observable Nodes SLI. In some examples, the SLI is the percentage of monitored nodes that are observable. In some examples, the SLI is determined as the ratio the number of nodes in the agent inventory list to the number of nodes in the total inventory list. In various examples, meta-monitoring service manager 542 outputs information based on the unobservable nodes, where the information may include the list of unobservable nodes, the observable nodes SLI, and/or other suitable information based on the determined unobservable nodes.

In some examples, the provided information about unobservable nodes may be filtered to provide one or more separate sets of information. For instance, in some examples, the information about unobservable nodes may be filtered by per customer, tenant, or the like. For instance, in some examples, a separate observable nodes SLI is determined for each customer, tenant, or the like. In some examples, the information about unobservable nodes may also be filtered based on other criteria. For instance, in some examples, a separate observable nodes SLI may be determined for each customer, but for some of the customers the SLI may be provided based on all nodes for the customer, and for some customers the SLI is provided based on a subset of nodes for the customer, such as based on compute nodes for the customer, nodes in a certain cluster for the customer, nodes in a certain region for the customer, and/or the like.

In some examples, the information about unobservable nodes is provided to each customer, such as by transmitting the information to each customer over a network. In some examples, the information about unobservable nodes is provided to each customer via a dashboard or the like. In some examples, the dashboard may provide the customer with information over time, so that the customer can see trends or the like.

FIG. 5 shows an example of an architecture that employs data pipelines. However, other architectures may be used in other examples. For instance, in some examples, instead of sending data to a data pipeline, an application may instead report directly to an orchestrator node that executes logic on an individual cluster level, and then provides the result up to logic at a higher level of the hierarchy. These variations and others are within the scope and spirit of the disclosure.

Figure 6:
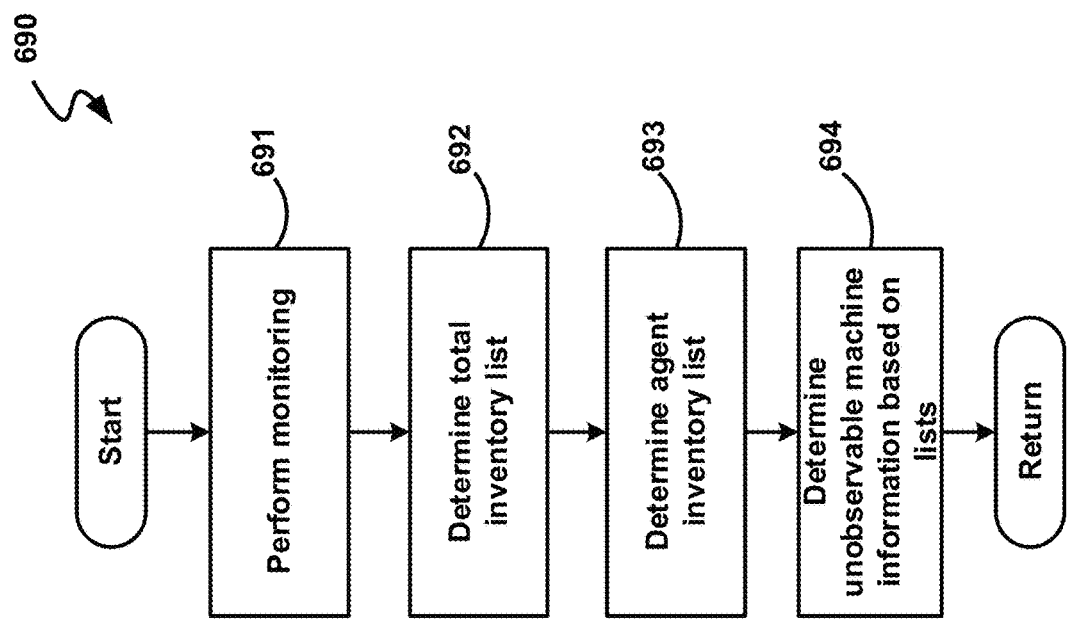
FIG. 6 is a flow diagram illustrating an example process for unobservable machine identification, in accordance with aspects of the present disclosure.

FIG. 6 illustrates an example dataflow for a process (69o) for unobservable node identification. In some examples, process 690 is performed by a device, distributed system, or the like, such as, for instance, device 200 of FIG. 2, meta-monitoring service manager 342 of FIG. 3, meta-monitoring service manager 442 of FIG. 4, and/or meta-monitoring service manager 542 of FIG. 5.

In the illustrated example, step 691 occurs first. At step 691, in some examples, a set of monitored machines are monitored. In some examples, each of the monitored machines includes associated monitoring logic that includes processor-executable code. In some examples, the monitoring logic is configured to transmit machine information while executing on processors. In some examples, performing the monitoring on the set of monitored machines includes receiving the machine information from the monitoring logic of the set of monitored machines. As shown, step 692 occurs next in some examples. At step 692, in some examples, a total inventory list of the set of monitored machines is generated in a manner that is independent of the monitoring of the monitored machines.

As shown, step 693 occurs next in some examples. At step 693, in some examples, an agent inventory list is generated such that the agent inventory list is a list of machines that, based on the monitoring of the monitored machine, are determined to have been running monitoring logic during a particular time period. As shown, step 694 occurs next in some examples. At step 694, in some examples, unobservable machine information that is associated with a set of unobservable machines is determined via at least a meta-monitoring processor based on a comparison of the total inventory list with the agent inventory list. Here, the term "meta-monitoring processor" simply identifies the processor as a processor that is associated with a meta-monitoring service that may be executing on at least one device in a distributed system or that that is managing a meta-monitoring service, as opposed to processors that are running the monitored machines and/or running on the monitored machines. The process may then advance to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. A system comprising:
   a processor; and
   memory comprising computer executable instructions that, when executed, perform operations comprising:
   identifying a total inventory list of first machines in a manner that is independent from monitoring the first machines;
   identifying an agent inventory list of second machines, each respective machine of the second machines including monitoring logic that transmits machine information for the respective machine, the second machines being identified based on determining that the second machines were running the monitoring logic during a time period; and
   determining a subset of the first machines are unobservable machines based on a comparison of the total inventory list to the agent inventory list.

2. The system of claim 1, wherein the first machines include a virtual machine and a physical machine.

3. The system of claim 1, the operations further comprising:
   presenting a list of the unobservable machines.

4. The system of claim 1, the operations further comprising:
   providing a service level indicator that indicates a percentage of the first machines that represent the unobservable machines.

5. The system of claim 1, wherein the monitoring logic collects event information for the respective machine, the event information comprising at least one of:
   system logs;
   performance metrics;
   security events; or
   application events.

6. The system of claim 1, wherein a meta-monitoring service determines whether the monitoring logic is:
   dropping data collected from the respective machine; or
   providing the data after a threshold amount of time.

7. The system of claim 1, wherein the unobservable machines are machines having monitoring logic that is at least one of:
   not running; or
   running and not providing expected information.

8. The system of claim 1, wherein the total inventory list indicates machines in a health state in which the monitoring logic is expected to present and running.

9. The system of claim 1, wherein the total inventory list is populated from a data pipeline that is connected to a data store comprising previously identified machines.

10. The system of claim 1, wherein the agent inventory list indicates machines in which the monitoring logic has sent the machine information during the time period.

11. The system of claim 1, wherein the agent inventory list includes identifying information for:
    the second machines; and
    customers associated with the second machines.

12. The system of claim 1, wherein the comparison of the total inventory list to the agent inventory list comprises:
    creating a joined list by joining the total inventory list to the agent inventory list based on machine identifications;
    identifying unmatched machines by identifying a first machine in the joined list that are not matched to second machines; and
    classifying the unmatched machines as the unobservable machines.

13. A method comprising:
    identifying a total inventory list of first machines in a manner that is independent from monitoring the first machines;
    identifying an agent inventory list of second machines, each respective machine of the second machines including monitoring logic that transmits machine information for the respective machine, the second machines being identified based on determining that the second machines were running the monitoring logic during a time period; and
    determining a subset of the first machines are unobservable machines based on a comparison of the total inventory list to the agent inventory list.

14. The method of claim 13, wherein the total inventory list comprises at least one of:
    machine names;
    machine globally unique identifiers (GUIDs);
    a group to which one or more of the first machines belongs; or
    a classification of one or more of the first machines.

15. The method of claim 13, wherein the total inventory list is aggregated from one or more service teams that maintain the first machines.

16. The method of claim 15, wherein the total inventory list is filtered to remove machines that are not to be monitored.

17. The method of claim 16, wherein a determination to not monitor the machines that are not to be monitored is based on a health state of the machines that are not to be monitored.

18. The method of claim 13, wherein the monitoring logic comprises a monitoring agent that transmits the machine information to a monitoring service that monitors at least one of health, performance, or usage of machines.

19. The method of claim 18, wherein the monitoring agent collects event information comprising at least one of:
information about a rate of page requests;
information about active connections; or
information about authentication failures.

20. A device comprising:
a processor; and
memory comprising computer executable instructions that, when executed, perform operations comprising:
identifying a total inventory list of first machines in a manner that is independent from monitoring the first machines;
identifying an agent inventory list of second machines, each respective machine of the second machines including monitoring logic that transmits machine information for the respective machine, the second machines being identified based on machine information received from the second machines during a time period; and
determining a subset of the first machines are unobservable machines based on a comparison of the total inventory list to the agent inventory list.

* * * * *